(12) United States Patent
Bono et al.

(10) Patent No.: US 8,516,375 B2
(45) Date of Patent: Aug. 20, 2013

(54) SLIDE KIT CREATION AND COLLABORATION SYSTEM WITH MULTIMEDIA INTERFACE

(75) Inventors: Charles A. Bono, Gwynedd Valley, PA (US); Ross E. Dworkin, Springfield, PA (US)

(73) Assignee: Litrell Bros. Limited Liability Company, Dover, DE (US)

( * ) Notice: Subject to any disclaimer, the term of this patent is extended or adjusted under 35 U.S.C. 154(b) by 318 days.

(21) Appl. No.: 13/042,839

(22) Filed: Mar. 8, 2011

(65) Prior Publication Data
US 2011/0161817 A1 Jun. 30, 2011

Related U.S. Application Data

(63) Continuation of application No. 11/779,982, filed on Jul. 19, 2007, now Pat. No. 7,934,160.

(60) Provisional application No. 60/820,925, filed on Jul. 31, 2006.

(51) Int. Cl.
*G06F 3/00* (2006.01)
*G06F 3/16* (2006.01)

(52) U.S. Cl.
USPC ............ 715/716; 715/719; 715/727; 715/732

(58) Field of Classification Search
USPC .................................. 715/716–732
See application file for complete search history.

(56) References Cited

U.S. PATENT DOCUMENTS

| | | |
|---|---|---|
| 5,749,908 A | 5/1998 | Snell |
| 6,396,500 B1 | 5/2002 | Qureshi et al. |
| 6,546,405 B2 | 4/2003 | Gupta et al. |
| 6,587,945 B1 | 7/2003 | Pasieka |
| 6,738,075 B1 | 5/2004 | Torres et al. |
| 7,257,769 B2 | 8/2007 | Caspi |
| 7,346,656 B2 | 3/2008 | Worthen |
| 7,373,590 B2 | 5/2008 | Woolf et al. |
| 7,934,160 B2 | 4/2011 | Bono et al. |
| 2002/0075572 A1 | 6/2002 | Boreczky et al. |
| 2003/0086682 A1 | 5/2003 | Schofield et al. |
| 2003/0105820 A1 | 6/2003 | Haims et al. |
| 2003/0124502 A1 * | 7/2003 | Chou ........................ 434/350 |
| 2003/0204490 A1 | 10/2003 | Kasriel |

(Continued)

OTHER PUBLICATIONS

United States Patent and Trademark Office, Non-Final Office Action, U.S. Appl. No. 11/422,445, mailed Nov. 16, 2010, 61 pages.

(Continued)

*Primary Examiner* — Tadeese Hailu
(74) *Attorney, Agent, or Firm* — Perkins Coie LLP

(57) ABSTRACT

A slide kit creation system and method allows reviewers of a slide kit to insert non-textual comments, such as audio comments, to be associated with selected slides. In one embodiment, audio comments are transmitted to a host computer by telephone, and may be posted on the host computer for access by other reviewers. The audio comments may also be transcribed in text form. In another embodiment, comments may be associated with various portions of a video, in the same manner. A video navigation bar is coded to indicate which portions of the video are associated with comments. Alternatively, certain attributes of the video can be altered to indicate the presence of comments associated with specific scenes of the video.

21 Claims, 11 Drawing Sheets

(56) References Cited

U.S. PATENT DOCUMENTS

| | | |
|---|---|---|
| 2003/0231198 A1 | 12/2003 | Janevski |
| 2004/0218904 A1 | 11/2004 | Yoon et al. |
| 2005/0031296 A1 | 2/2005 | Grosvenor |
| 2005/0120127 A1 | 6/2005 | Bradley et al. |
| 2005/0144258 A1* | 6/2005 | Burckart et al. ............ 709/218 |
| 2006/0026502 A1 | 2/2006 | Dutta |
| 2006/0067578 A1 | 3/2006 | Fuse |
| 2006/0080716 A1* | 4/2006 | Nishikawa et al. ............ 725/89 |
| 2006/0184872 A1 | 8/2006 | Dontcheva et al. |
| 2006/0184980 A1 | 8/2006 | Cole |
| 2006/0190250 A1 | 8/2006 | Saindon et al. |
| 2006/0218004 A1 | 9/2006 | Dworkin et al. |
| 2006/0236246 A1 | 10/2006 | Bono et al. |
| 2006/0253542 A1 | 11/2006 | McCausland et al. |
| 2006/0294468 A1 | 12/2006 | Sareen et al. |
| 2007/0100939 A1 | 5/2007 | Bagley et al. |
| 2007/0100986 A1 | 5/2007 | Bagley et al. |
| 2007/0245243 A1 | 10/2007 | Lanza et al. |
| 2007/0245248 A1* | 10/2007 | Christiansen ............ 715/753 |
| 2007/0256030 A1* | 11/2007 | Bedingfield, Sr. ............ 715/853 |
| 2007/0271338 A1 | 11/2007 | Anschutz |
| 2007/0282948 A1* | 12/2007 | Praino et al. ............ 709/204 |
| 2007/0294623 A1* | 12/2007 | Saavedra ............ 715/730 |
| 2008/0028323 A1 | 1/2008 | Rosen et al. |
| 2009/0196570 A1 | 8/2009 | Dudas et al. |
| 2009/0268886 A1 | 10/2009 | Balentine et al. |
| 2010/0199182 A1 | 8/2010 | Lanza et al. |

OTHER PUBLICATIONS

United States Patent and Trademark Office, Final Office Action, U.S. Appl. No. 11/422,445, mailed Apr. 29, 2011, 59 pages.

United States Patent and Trademark Office, Non-Final Office Action, U.S. Appl. No. 11/779,982, mailed Apr. 23, 2010, 19 pages.

United States Patent and Trademark Office, Final Office Action, U.S. Appl. No. 11/779,982, mailed Sep. 20, 2010, 24 pages.

United States Patent and Trademark Office, Notice of Allowance, U.S. Appl. No. 11/779,982, mailed Dec. 15, 2010, 8 pages.

Araque Jr., Gerry, USPTO Examiner. Microsoft PowerPoint 2003 Example disclosing the claimed invention 11/422,445, Example created Apr. 21, 2011, 16 pages.

Advisory Action for U.S. Appl. No. 11/422,445, mailed Sep. 1, 2010, 3 pages.

Final Office Action for U.S. Appl. No. 11/087,404, mailed May 19, 2010, 85 pages.

Final Office Action for U.S. Appl. No. 11/422,445, mailed Jun. 23, 2010, 47 pages.

Microsoft Office Online, "About Managing Alerts Received from a SharePoint site," http://office.microsoft.com/en-us/outlook/HP010524771033.aspx, accessed May 7, 2009, 3 pages.

Microsoft Office Online, "Keep Up with Changes to Shared Projects," http://office.microsoft.com/en-us/word/HA011426511033.aspx, accessed May 7, 2009, 4 pages.

Microsoft Office Online, "Subscribe to be Notified of Changes to a File or Discussion," http://office.microsoft.com/en-us/powerpointt/HP030701181033.aspx, accessed May 7, 2009, 2 pages.

Microsoft Office Online, "Tracking Project Changes," http://office.microsoft.com/en-us/powerpoint/HA011232031033.aspx?pid=CL100626991033, accessed May 7, 2009, 3 pages.

Microsoft PowerPoint 2003 Example created Feb. 24, 2010, 55 pages.

Non-Final Office Action for U.S. Appl. No. 11/087,404, mailed Jan. 6, 2010, 43 pages.

Non-Final Office Action for U.S. Appl. No. 11/422,445, mailed Feb. 26, 2010, 97 pages.

Web Page entitled: "Upload Video, Collaborate Online, Launch your own tv station," www.mediasilo.com, Jul. 17, 2007, 1 page.

\* cited by examiner

FIG. 4

Transcriber Page

Transcriptions to be downloaded

| Filename | size | Type | Date | uploaded | DNYet |
|---|---|---|---|---|---|
| Adsfasfddas | 400 | mp3 | 5/5/2006 | y | |
| nbnbbddas | 300 | mp3 | 5/6/2006 | n | |

[Download next file]

[Upload transcribed file]

[Logout]

FIG.5

Transcriber upload screen

Sound files downloaded

| Filename | Date |
|---|---|
| Adsfasfddas | 5/6/2006 |
| Nbnbbddas | 5/7/2006 |

Transcriptions uploaded

| Filename | Count | Line |
|---|---|---|
| Adsfasfddas | 450 | |

Select File: [ Browse.. ] Number of lines

[ Upload a File ]

FIG.6

SLIDE KIT CREATION AND COLLABORATION SYSTEM WITH MULTIMEDIA INTERFACE

CROSS-REFERENCE TO PRIOR APPLICATION

This application is a continuation of U.S. patent application Ser. No. 11/779,982, filed Jul. 19, 2007, which claims priority to U.S. provisional patent application Ser. No. 60/820,925, filed Jul. 31, 2006, and all of which are incorporated by reference herein.

BACKGROUND OF THE INVENTION

This invention relates to the field of information management. The invention provides a system and method for creation and modification of slide kits. Such slide kits are used in presentations given for educational purposes, or presentations given for marketing of products or services, or other contexts. The invention also includes a system and method for editing of video content.

Slides are frequently used in the delivery of oral presentations, whether in academic environments, in business, or in other environments. The term "slide" originally referred to a translucent photographic film that would move ("slide") into position in a projector, for viewing on a screen. Modern technology has largely replaced the old photographic slide by a computer-generated image that is projected onto a screen.

Modern "slides" are typically created by known software programs, such as PowerPoint (the term PowerPoint is a trademark of the Microsoft Corporation, of Redmond, Wash.). The images created by these programs are still called "slides", even though they are not photographic, and do not physically "slide" through anything.

In this specification, the term "slide" is used in its most general meaning, to include both conventional photographic slides, as well as computer-generated images. Indeed, in this specification, the term can refer to any display of information, whether the display is static or moving (such as a video), provided that that display can be handled as a unit, and placed in a series containing other similar or dissimilar units.

A set of slides (a "slide kit") is typically created and edited by a plurality of persons located in geographically disparate places. The same is true for the creation and editing of a video. Examples of systems and methods which facilitate collaboration among persons in the creation and editing of slide kits are given in U.S. patent application Ser. No. 11/087,404, filed Mar. 23, 2005, and published as US 2006-0236246 A1, and U.S. patent application Ser. No. 11/422,445, filed Jun. 6, 2006, and published as US 2006-0218004 A1. The disclosures of both of the above-cited applications are incorporated by reference herein.

The present invention comprises improvements over the systems and methods described in the above-cited applications.

The above-cited applications describe systems and methods which save time by reducing the number of redundant comments received from participants in the slide kit creation and editing process, by organizing such comments and requested changes, and by implementing a formal approval process while documenting all comments and changes made to the slides.

A primary component of the above-described systems is a display screen which shows the contents of a slide kit, one slide at a time, to reviewers, to give the reviewers the opportunity to comment on the slides. The comments can take the form of text, images, or other reference material. The present invention enables the collaborators to include multimedia content, such as audio and other content, during the editing process. The invention also provides a collaborative method for editing a video.

SUMMARY OF THE INVENTION

The present invention comprises a method of creating a slide kit, wherein a plurality of reviewers submit comments relating to specific slides in the kit. In one embodiment of the invention, the reviewer submits a comment by audio transmission technology, such as by telephone, by voice-over Internet protocol (VOIP), or even through a microphone directly connected to a computer. The comment is stored as an audio file, on a host computer, accessible to other reviewers through a link posted on the host computer. The audio file may be transcribed by a human transcriber, and the transcribed file may also be made available to the reviewers. The invention also includes a system for implementing the above-described method. Thus, the host computer is programmed to execute the above-described method, using a network connection (such as the Internet) to establish connections with the reviewers. The host computer may also be programmed to notify reviewers of the existence of comments, made with respect to particular slides, by other reviewers.

Another embodiment of the invention relates to a method and system for creation and editing of a video. In this embodiment, instead of selecting static slides to be commented upon, a reviewer selects a key frame, shown on a screen display, and the portion of the video associated with the selected key frame is played for the reviewer. The reviewer can then submit comments relating to the displayed portion of the video, either in text form, or in a non-text form, such as by transmission of an audio comment or image. The system makes the comments available to all reviewers. The system may also be programmed to notify reviewers when other reviewers have commented upon particular portions of the video.

In the latter embodiment, the system also provides a video navigation bar which is coded to indicate the portions of the video which have comments associated therewith. In another variation, the system may vary an attribute of the video display to indicate the portions of the video having comments. For example, the video could be displayed with a tint or overlaid color, when the displayed portion or scene has been associated with a comment.

Navigation through the video is aided by the display of key frames. A key frame can be defined as a representative frame (such as the first frame) from each scene of the video. Alternatively, a key frame could be defined as a representative frame (such as the first frame) from each scene of the video having comments associated therewith.

The present invention therefore has an object of providing a system and method for creation and editing of a slide kit.

The invention has the further object of enabling reviewers, who are collaborating on the creation of a slide kit, to submit non-textual comments, such as audio comments, relating to selected slides of the kit.

The invention has the further object of enabling reviewers of a slide kit to have quick access to the audio comments made by other reviewers with respect to particular slides.

The invention has the further object of facilitating the cooperation of a plurality of reviewers, who may be in disparate geographical locations, in the creation of a slide kit.

The invention has the further object of facilitating the cooperation of a plurality of reviewers, who may be in disparate geographical locations, in the creation of a video.

The invention has the further object of enabling reviewers of a video to view comments submitted by other reviewers, with respect to selected portions of the video.

The invention has the further object of enabling reviewers of a video to approve comments submitted by other reviewers, with respect to selected portions of the video.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 4 provides a diagram showing a display screen, used in the present invention, as seen by a reviewer who is listening to the audio comment of another reviewer.

FIG. 5 provides a diagram showing a display screen, used in the present invention, as seen by a transcriber of the audio comments.

FIG. 6 provides a diagram showing a display screen, used in the present invention by a transcriber to upload transcribed comments to a desired location.

DETAILED DESCRIPTION OF THE INVENTION

Figure 1:
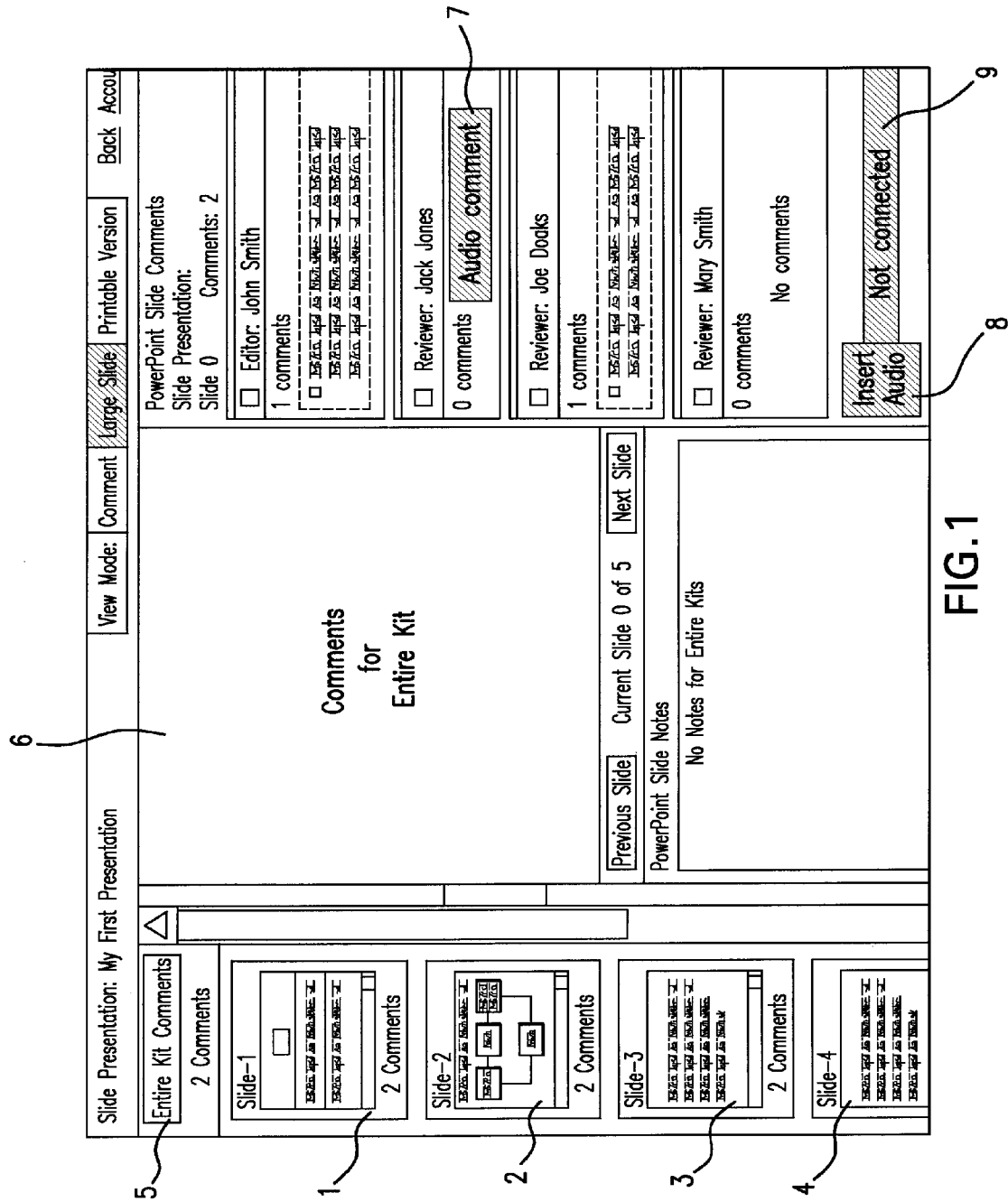
FIG. 1 provides a diagram showing a display screen, used in the present invention, which gives a reviewer the opportunity to insert an audio comment.

In one embodiment, the present invention comprises a slide collaboration system, similar to those described in the above-cited references, in which the users can insert multimedia content. That is, the users can add comments to the slides, using formats other than text. In the examples described below, the comments are audio files which are transmitted by telephone. The comments could instead be photographs, videos, or any multimedia materials. In general, the present invention can thus be described as a method for adding comments, in multimedia formats, to a slide kit.

In the example where the comments are in audio form, the system offers the reviewer, i.e. the person reviewing the slides, the opportunity to connect to the system by telephone. The user can then transmit an audio record simply by speaking into the telephone.

Although the user may initially be required to call into the system and enter a user ID and password, the present embodiment is distinguished by the fact that, when the user wishes to enter an audio comment, the system can be programmed to telephone the reviewer. Such calling is made feasible by the advent of VOIP technology.

In using the invention to add an audio comment, the reviewer clicks on a button labeled "Insert Audio", and is asked to verify (or change, if permitted by the system) the previously stored telephone number at which the reviewer is to be reached. The system then telephones the reviewer. Once the telephone connection is made, the reviewer can then record the comment. During the recording process, the reviewer has access to such recording functions as "Start recording", "Re-record", "Rewind", "Pause", and "Stop". The reviewer may be provided with online audio editing features. After the reviewer has completed the comment, he or she can disconnect, or can remain connected to record additional comments.

When reviewing the recording made, the user can listen to the audio either on the telephone or through the computer.

Another element of the invention is the ability to insert audio material into an existing audio track, assuming that the reviewer has permission to do so. Specifically, when the reviewer is listening to the audio comment of a colleague, the reviewer can click "insert" during the recording, at which point the reviewer can record his or her comments, and then can click "stop" when finished.

The existing audio file will then be tagged to indicate the presence of embedded comments, and during playback, at the appropriate point, the system will announce "inserted by . . . ", indicating the name of the commenter, and the date and time of insertion of the comment. At the conclusion of the added audio comment, the system will provide a message such as "insertion completed".

The insertion of audio comments into an audio file can be accomplished in at least two different ways. First, one could split the original audio file into two segments, and during playback, one could switch from the original first segment to the inserted comment, and then one could switch back from the inserted comment to the next segment of the original file. Secondly, one could recreate the original audio file to include the audio insert, so that there is only one audio file which includes the insert.

Although the above examples deal with audio files, the user could upload virtually any multimedia file, including photographs, diagrams, videos, etc. The system would insert the multimedia file in a similar way to what has been described above.

The invention, as described so far, has at least the following uses:

1. The system can call into a live conference, to provide access to the audio comments associated with each slide. Moreover, those experts who cannot participate in the live conference can listen to the discussion later, and can insert comments where appropriate. This process provides flexibility and convenience in conducting live slide reviews.

2. The system can be used to transmit and review a lecture. The lecturer can provide the lecture, in audio form, using this system, with reference to slides, since the audio comments provided by the lecturer could comprise the lecture. Later, others can review the lecture, and can insert audio comments. The entire process can later be transcribed to produce a single, more polished lecture.

3. The system can be used to aid in the efficient creation of a slide presentation. In this embodiment, the user uploads a slide kit, and then "speaks" to each slide, i.e. inserts comments associated with each slide. The system can then automatically generate a synchronized slide presentation in a standard format.

4. The system can be used for diagnostic and other expert commentary. The slides could be X-rays, for example, and the radiologist could provide an audio comment for each slide.

5. The system can be used to create an online debate. A blog, such as one dealing with economics, politics, etc., could play a speech, and critics could listen to that speech and insert opposing points of view, in audio form, at appropriate times.

The user of the system of the present invention may submit the entire slide kit, with the associated comments, for transcription. Access to the site would then be provided to a transcriber, who could be located virtually anywhere, for preparation of a written transcript. If it is desired to keep the content of the slide kit and comments confidential, the system can divide the audio file associated with each slide into several files, and can make these audio files available separately, possibly even to different transcribers. Then, when the transcription is uploaded to the system, the system can assign the transcribed content to the appropriate slide.

FIG. 1 illustrates a typical screen display, as seen by a reviewer who is given the opportunity to insert an audio comment to a slide forming part of a slide kit. The contents of the slide kit are shown, in thumbnail form, as images 1, 2, 3, and 4, on the left-hand column. Only four such images are visible in FIG. 1, but a scroll bar provides access to other images of slides in the kit. Clicking on one of these thumbnail images causes the selected slide to be displayed, in a large format, in central display area 6. The left-hand column also includes a block 5, labeled "Entire Kit Comments", which provides a display of the written comments received so far for the entire kit. In the example shown, the user has clicked on block 5, so that the comments for the entire kit are shown in central display area 6. The user can also navigate through the kit by clicking on the "Next Slide" or "Previous Slide" buttons, below the central display area.

The legend "PowerPoint Slide Notes", shown below the central display area, refers to notes which may be part of the slide itself, when the slide is first created. Such notes are not to be confused with comments on slides made by the reviewers. When the reviewer clicks on a thumbnail image of a particular slide, in the left-hand column, and that slide is displayed in the central display area, any notes associated with the slide are simultaneously displayed in the area below the central display area. In the example represented in FIG. 1, the reviewer has selected "Entire Kit Comments", which is a choice for which there would be no notes.

The right-hand side of the display comprises blocks identifying the various reviewers, or other participants, in the slide kit creation and editing process. In the example shown, "John Smith" is an editor who has provided one written comment, displayed symbolically under his name. Another written comment has been supplied by a reviewer named "Joe Doaks", and the comment is displayed below the name. "Jack Jones" is a reviewer who has posted an audio comment, available by clicking on button 7. "Mary Smith" is a reviewer known to the system, but who has not yet posted any comments.

To insert an audio comment, the reviewer clicks on button 8, labeled "Insert Audio". Box 9 indicates the status of the system, i.e. whether or not the reviewer is currently connected, by telephone, to the system, for transmittal of an audio comment. At the moment represented by FIG. 1, the reviewer has not yet clicked button 8, and therefore box 9 indicates that the reviewer is "not connected" to the host system.

Figure 2:
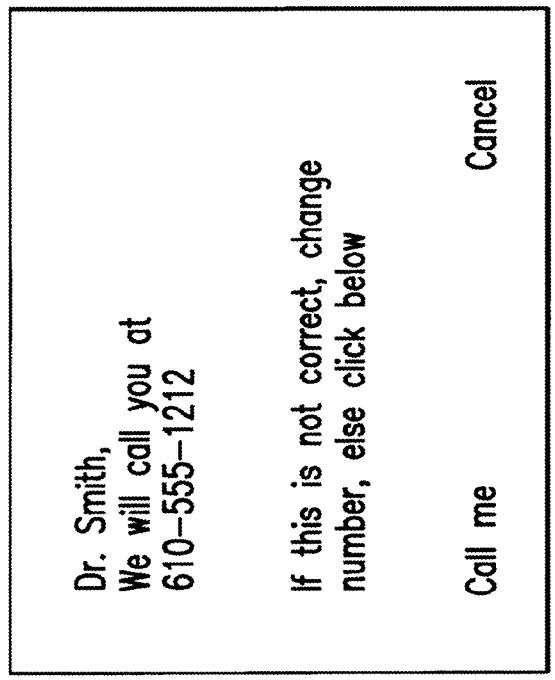
FIG. 2 provides a diagram showing a hypothetical display screen in which the system of the present invention verifies the telephone number of a reviewer who wishes to insert an audio comment.

After the reviewer clicks on the "insert audio" button, the system responds with the display shown in FIG. 2. Specifically, the system verifies the name and telephone number of the reviewer, giving the reviewer the option to authorize the system to make contact by telephone. The system then places the telephone call to the reviewer.

Figure 3:
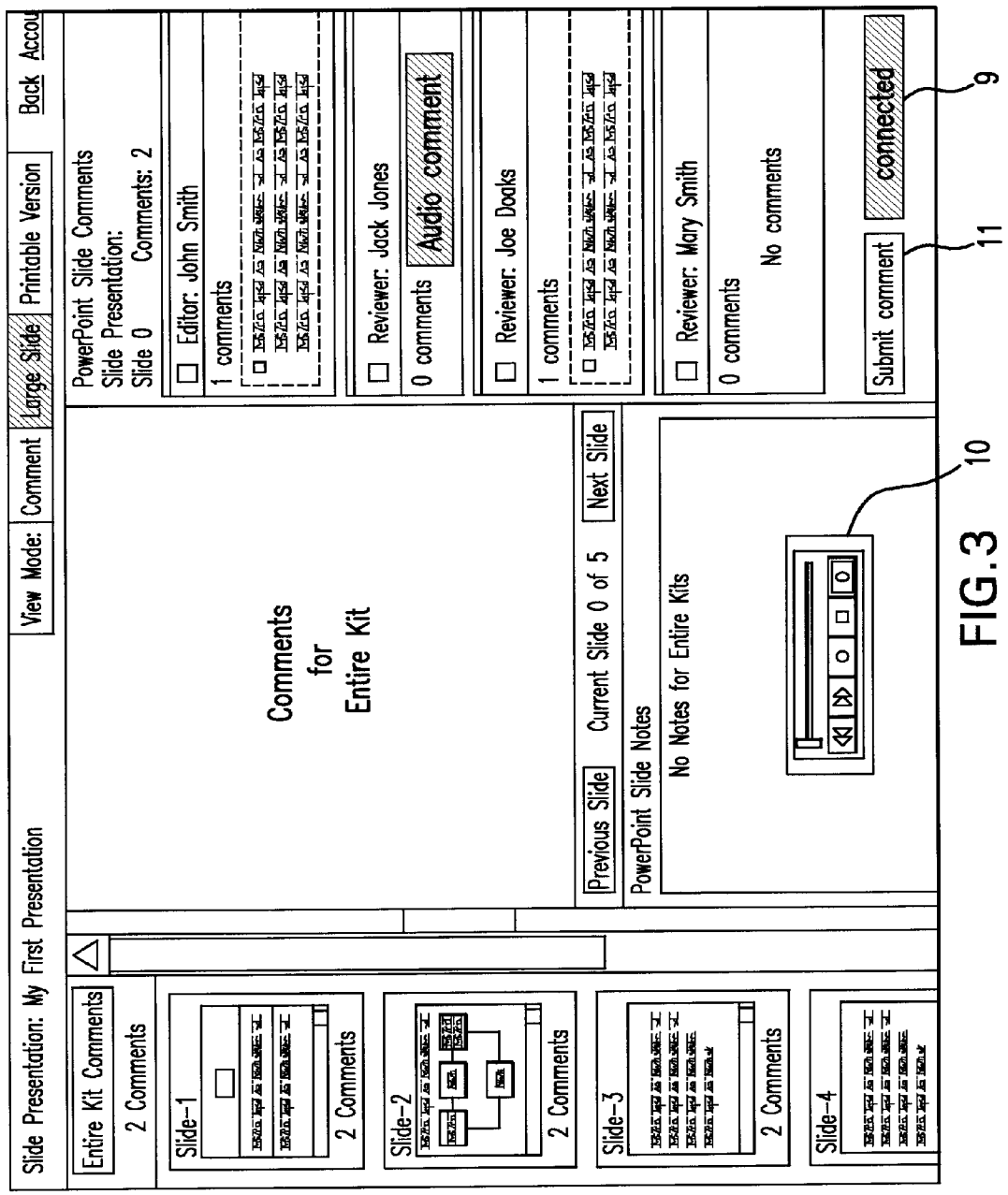
FIG. 3 provides a diagram showing a display screen, used in the present invention, as seen by a reviewer while the reviewer is adding an audio comment.

FIG. 3 illustrates the display screen while the reviewer is speaking. Note that box 9 now indicates that the system is connected by telephone to the reviewer. The reviewer speaks into the telephone, and when finished, can either simply submit the comment, by clicking on the "Submit Comment" button 11, or re-record the comment. The "submit comment" button has replaced the "insert audio" button. The controls in block 10 enable the reviewer to navigate through the audio comment, before that comment has been submitted. The audio comment is automatically associated, by the system, with the slide which has been selected for display in the central display area.

The arrangement provided in the examples represented in FIGS. 1-3 can be modified, within the scope of the invention. For example, instead of replacing the "insert audio" button with the "submit comment" button, the system could display both buttons, possibly with one or the other greyed out.

Suppose now that the reviewer has just logged onto the system, and wishes to listen to, and possibly comment on, an audio comment previously submitted by another reviewer. The right-hand column of FIG. 1 shows one such audio comment, namely the one provided by the reviewer Jack Jones. The reviewer clicks on button 7 to listen to that comment. Box 9 would still indicate that the system is not connected, because when the reviewer is simply listening to a comment, there is no active telephone connection between the system and the reviewer.

Figure 4:
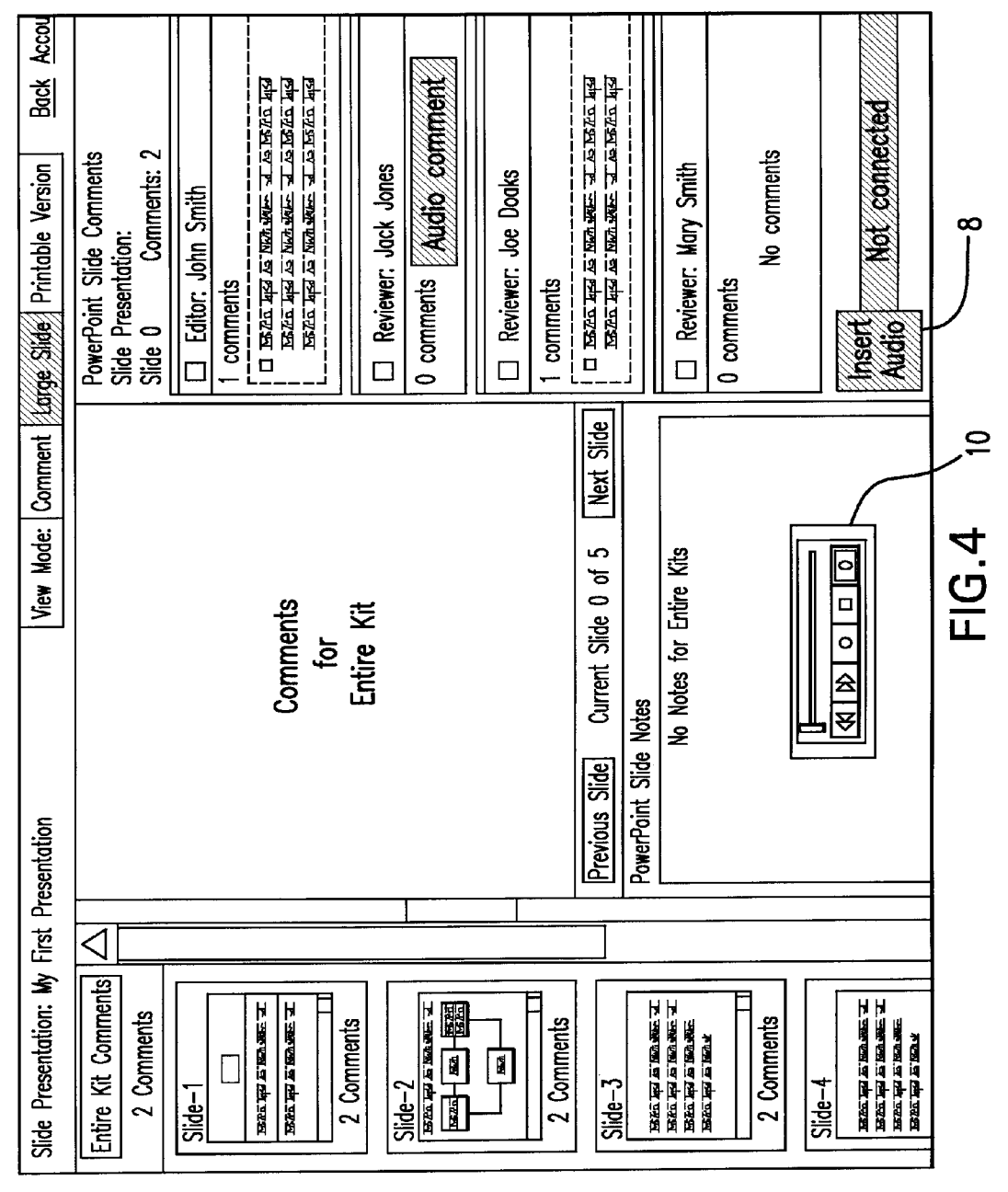

FIG. 4 illustrates the display as it would appear while the reviewer listens to the selected audio comment. Block 10 appears on the screen, to provide audio controls. If the reviewer wants to insert audio comments relating to the selected comment, the reviewer clicks on button 8, and the system connects to the reviewer as described above. The reviewer can then provide the comment by speaking into the telephone.

Another feature of the present invention concerns notification of reviewers about comments on slides. In one embodiment, the system is programmed to notify each reviewer who has commented on a particular slide, when another reviewer has commented on that slide. The notification is preferably performed by email. That is, the system sends an email to all reviewers who have commented on the slide in question, the email containing a link to the comment, to that slide, submitted by the other reviewer. The system can send multiple emails, or a single email containing multiple links, to alert the reviewer about all comments made by other reviewers to that particular slide.

The notification of reviewers could also be performed in other ways, such as by telephone, or through an online interface.

In another embodiment, the system can be programmed to notify all reviewers who have viewed a particular slide, concerning the existence of one or more comments to that slide. That is, in this alternative, a reviewer who has reviewed a slide would receive notification of comments even when he or she has not submitted a comment to that particular slide. The notification would be performed in the same manner as described above.

FIG. 5 illustrates a typical display screen as seen by a transcriber. The transcriber logs into the system, and is presented with a display as shown. In this example, the transcribers download audio files from different parts of different presentations, to enhance security. The display shows the files available, identified by file name, size, type, and date of creation. The display also indicates, to the transcriber, whether a transcribed version of the original file has been uploaded yet. In the final column, the display indicates whether the file has been downloaded yet.

To download an audio file, the transcriber can either click on the file name, or can click the "Download next file" button. The file being downloaded could be transmitted in a batch form, or it could be streamed to the transcriber. When the transcriber has created a transcript of the downloaded file, the transcript can be uploaded to the system by clicking on the "Upload transcribed file" button.

After multiple transcribers transcribe all of their audio files, and have uploaded them to the host system, the system will match each transcript to the proper slide.

FIG. 6 shows the transcriber upload screen. Among other things, this screen insures that the name of the uploaded Word document matches the name of the downloaded audio file. The transcriber is given the opportunity to select a file for uploading, by browsing through the contents of a local hard drive, and to upload the file. The display shows which files have been downloaded, and which files have been uploaded, by the transcriber.

The present invention can be practiced with or without the step of transcription. It is possible to provide the audio comments solely in audio form, accessible only by clicking on the appropriate button. The step of transcription enables the reviewers to see the comments in textual form as well. Thus, the invention comprises providing comments, in either or both of audio and textual form.

FIGS. 7-10 illustrate an embodiment of the invention which enables a group of persons to collaborate on the creation and editing of a video. In particular, according to the invention, each participant has access to the video being edited, with standard controls for viewing (i.e. fast forward, rewind, play, pause, stop). While viewing the video, each participant can add comments to specific portions of the video. Also, each participant, while reviewing the video, will see the comments, inserted by others, with respect to identifiable portions of the video.

Sections of the video which contain at least one comment are indicated by shading along the video location bar. The shading can be designed to indicate how many comments have been associated with the portion of the video. For example, light shading of a segment of the video location bar can indicate the presence of a single comment, and dark shading could indicate the presence of two or more comments.

To navigate through the video, the left-hand column of the display screen can contain one of at least two possible types of thumbnail images. In one case, the thumbnail images represent "key" frames, such as the first frame of a scene. In another case, the thumbnail images represent scenes of the video with which comments are associated.

Figure 7:
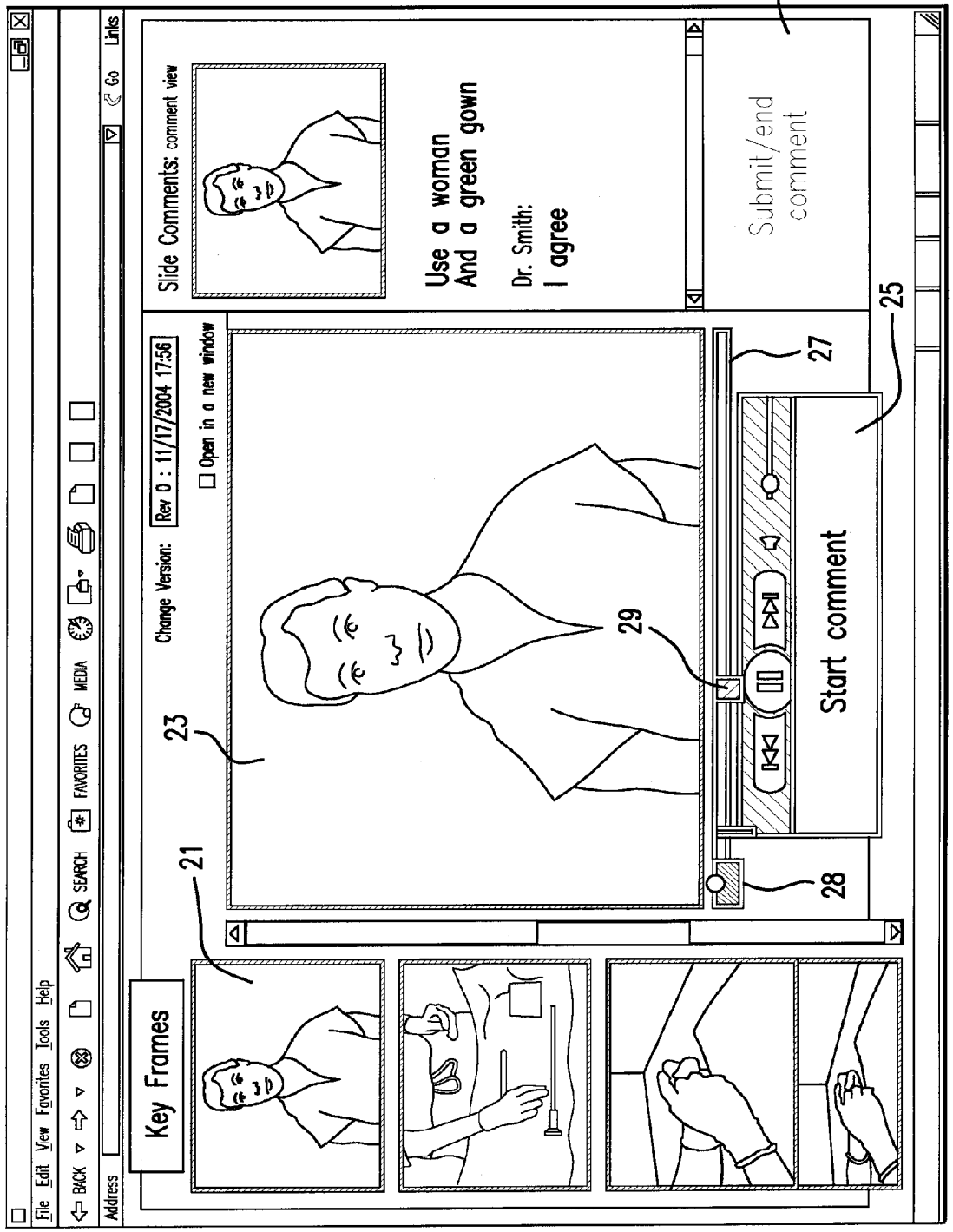
FIG. 7 provides a diagram showing a display screen, used in the present invention, to enable a reviewer to insert comments pertaining to a video.

FIG. 7 illustrates a typical screen for use by a reviewer of a video. Key frames of the video are shown in the left-hand column. Existing technology can be used to identify automatically the first frame of each scene. That is, the software for identifying the first frame of each scene of a video is commercially available, and does not, by itself, form part of this invention.

In the example of FIG. 7, the reviewer has clicked on frame 21, and therefore the scene represented by this frame is what is shown in central display area 23. Note, however, that what is shown in the central display area will be moving, since the object being edited is a video, not a collection of static images. The central display area will show the scene from the video which has been selected by clicking on a key frame in the left-hand column. Button 25 is used by the reviewer to start to dictate a comment, and button 26 is used to indicate that the comment is complete, and is ready to be sent to the host computer. FIG. 7 represents a point at which the reviewer has not yet started a comment. Therefore, button 25 is presented in full, and button 26 is greyed out. That is, one cannot designate the completion of a comment when a comment has not yet been initiated.

Video navigation bar 27 indicates the portion of the video being viewed at any given moment. Standard video controls (i.e. fast forward, rewind, etc.) are provided in the vicinity of the video location bar. Shaded areas 28 and 29 identify portions of the video which are associated with comments. As noted above, a light shading, such as that shown in area 29, could be used to indicate the presence of only one comment. A darker shading, such as that shown in area 28, could be used to indicate the presence of more than one comment. Other schemes for identifying the types of shaded areas could be used, within the scope of this invention. In general, the invention includes coding of the video navigation bar to indicate portions of the video with which comments have been associated.

Written comments pertaining to the selected scene are shown in the right-hand column. Thus, in the example of FIG. 7, one reviewer has suggested replacing the man in the scene with a woman in a green gown. Another reviewer has indicated agreement with this suggestion.

In the example shown, the comment submitted is in written form. But, in general, the comments could take the form of written comments, or an audio file, or other media. If the comments have the form of an audio file, for example, a link to the audio file would be provided on the screen in exactly the same manner as shown in FIGS. 1, 3, and 4.

Figure 8:
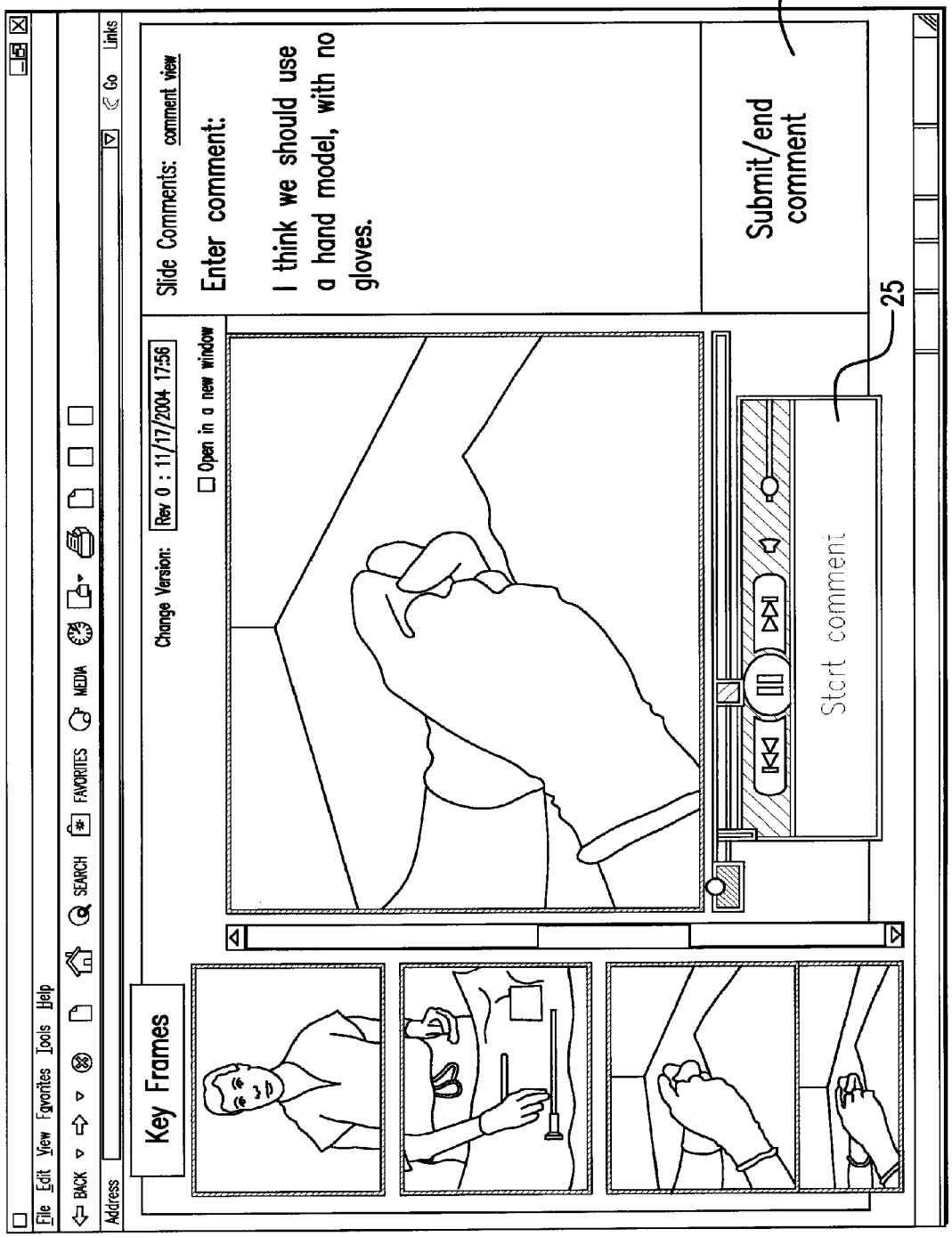
FIG. 8 provides a diagram showing a display screen, used in the present invention, representing the insertion of a comment, by a reviewer, to a section of a video.

In FIG. 8, the reviewer is adding a comment to the selected portion of the video. Thus, the "Start Comment" button 25 is greyed out, while the Submit/end comment button 26 is shown in full. In the example given, a reviewer has commented that the video should use a hand model with no gloves.

Figure 9:
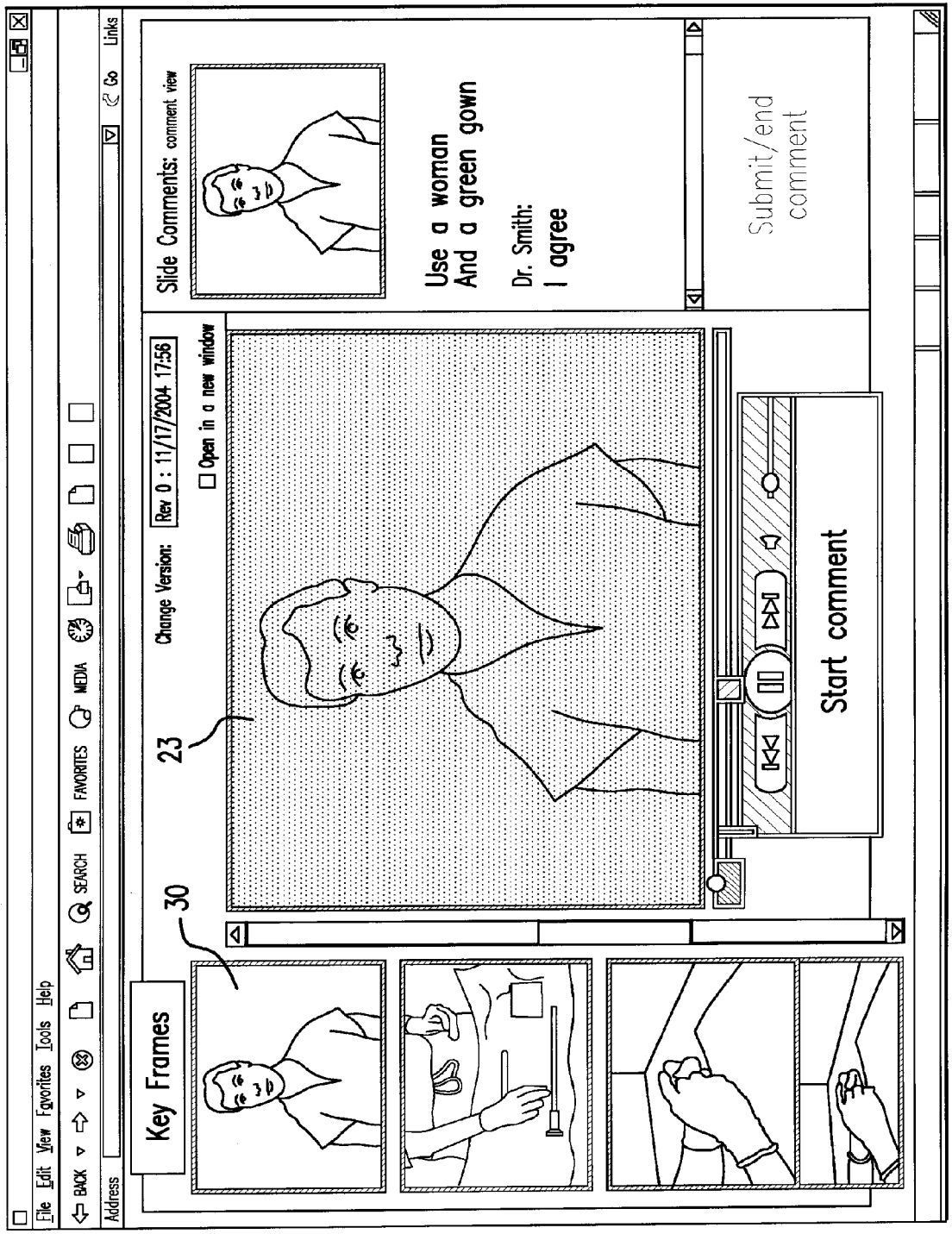
FIG. 9 provides a diagram showing a display screen, used in the present invention, illustrating the coding of portions of a video to indicate, to a reviewer, where the comments are located.

FIG. 9 illustrates the feature wherein portions of the video with which comments are associated are indicated by alteration of the main video display. Thus, in this example, the central display area 23 has a tint, or colored overlay, or the like, during portions of the video having associated comments. This color or tint preferably remains on the video for the duration of the segment of the video for which there are associated comments. The tint is provided on the central display area only. Note that the portion of the video being shown in the central display area corresponds to the scene represented by the thumbnail image 30 at the top of the left-hand column. In general, other attributes of the video could be altered to indicate the presence of a comment.

Figure 10:
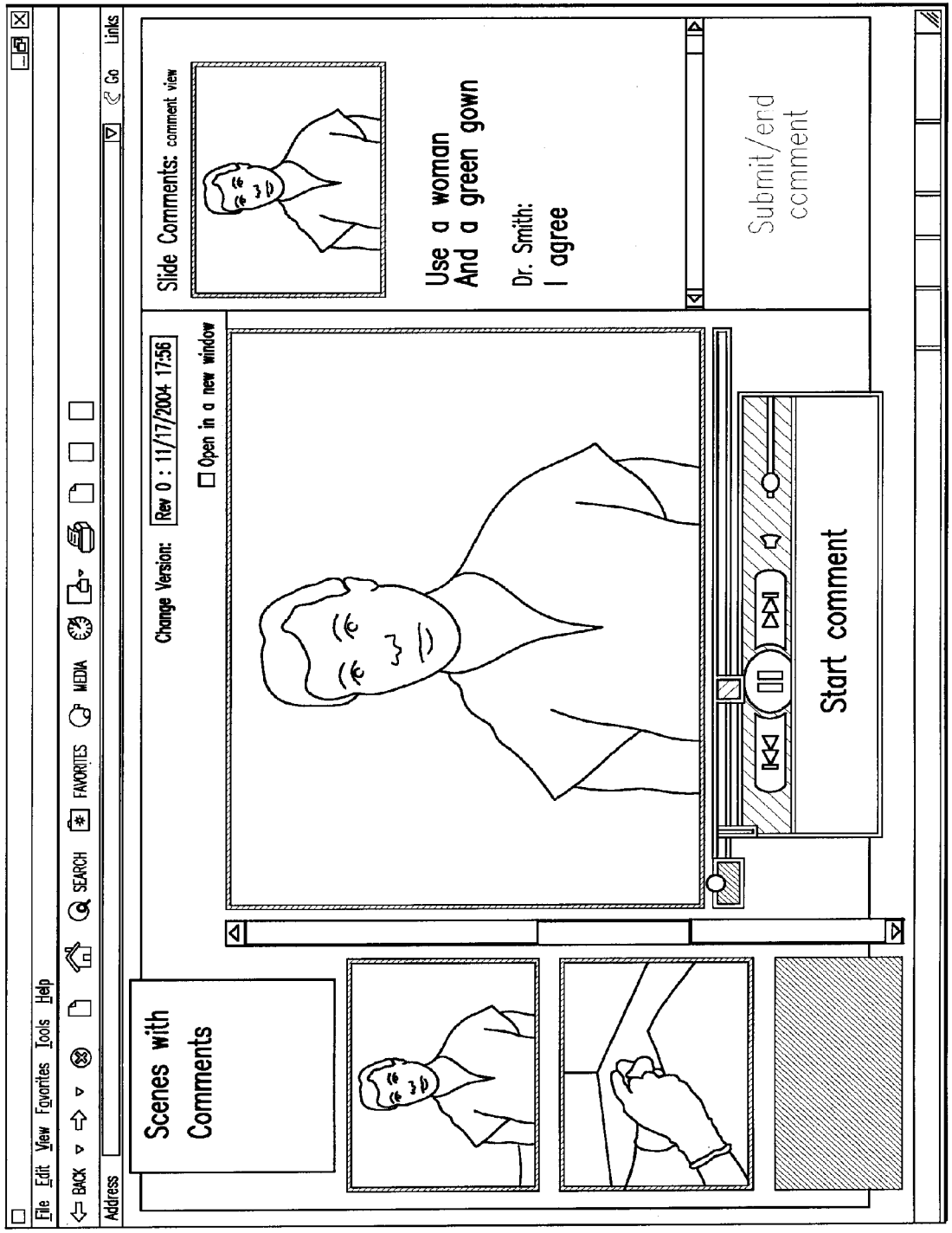
FIG. 10 provides a diagram showing a display screen, used in the present invention, illustrating how the system indicates which scenes of a video contain comments submitted by a reviewer.

FIG. 10 is similar to FIG. 9, except that FIG. 10 relates to the variation wherein the thumbnail images in the left-hand column relate not to the beginning of each scene, but instead identify scenes having associated comments.

Figure 11:
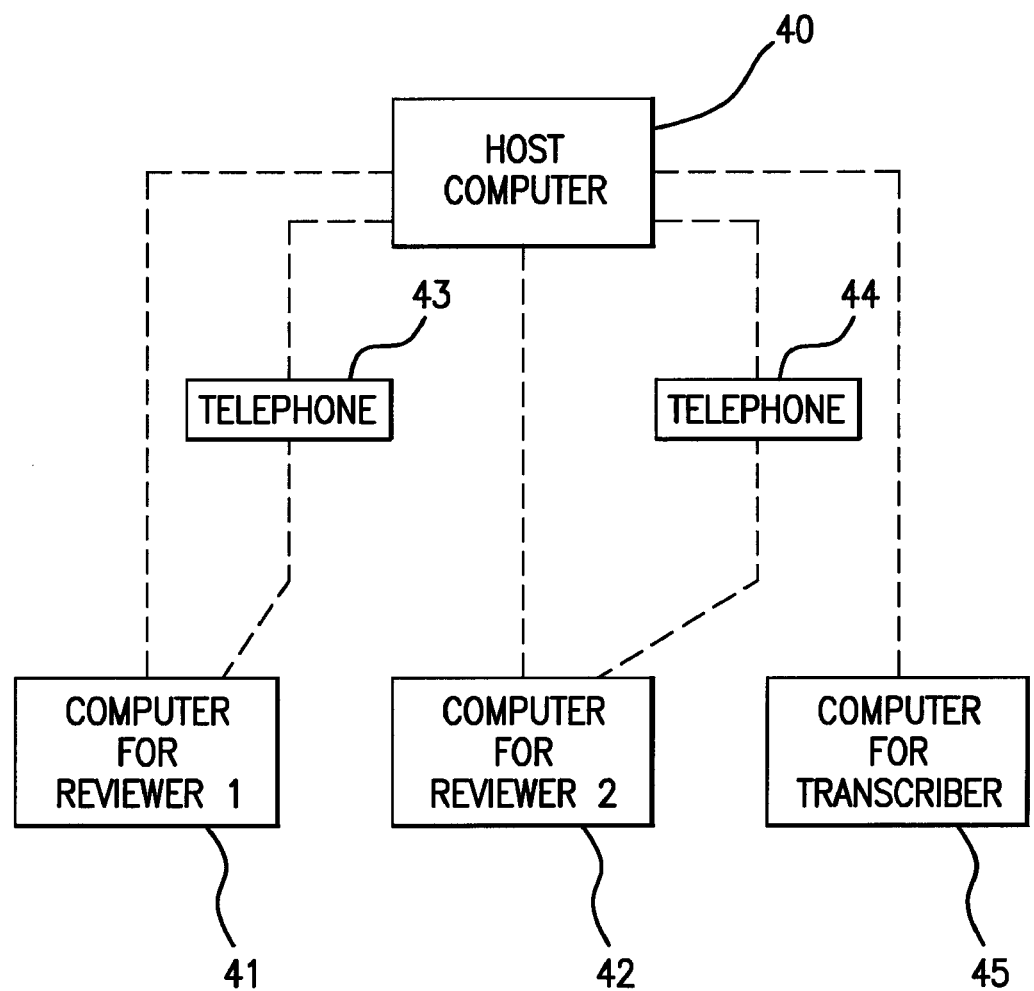
FIG. 11 provides a block diagram showing the components of the system of the present invention.

FIG. 11 provides a block diagram illustrating the major components of the system of the present invention. FIG. 11 applies to both of the embodiments described above. The system is implemented on host computer 40, which communicates by a network connection (such as an Internet connection) with computers 41 and 42 associated with reviewers. For simplicity, the computers of only two reviewers are shown, but in practice, there may be many more such computers. The computers of the reviewers may also be connected by telephone; FIG. 11 shows telephone 43 associated with computer 41, and telephone 44 associated with computer 42. The telephones could be implemented directly by the computers, i.e. using known VOIP technology, and in such case, the invention could be practiced without a separate telephone connection to the host computer. That is, a single Internet connection between the host and the reviewers would suffice to provide the telephone link.

Computer 45 represents the computer associated with one of the transcribers. For simplicity, only one transcriber is represented, but in general, there may be many transcribers.

Host computer 40 also comprises means for notifying the reviewers of the existence of comments, made by other reviewers, to particular slides. That is, computer 40 is preferably programmed to send an email to each reviewer who has commented on a particular slide, the email containing a link to the comment or comments, to the same slide, submitted by other reviewers. Alternatively, computer 40 can be programmed to send an email to each reviewer who has reviewed a particular slide, each email containing a link to comments made, to the same slide, by other reviewers.

For the embodiment comprising the creation of audio or other non-textual comments to a slide kit, the host computer comprises a means for displaying the slides to the reviewer, and the means for accepting the audio comment (or other non-textual comment) from the reviewer, and for associating that comment with a selected slide. The host computer also comprises a means for posting a link, associated with a comment, to provide access to the comment by the reviewers.

The transmission of an audio comment can be accomplished by any of various technologies. The comment could be transmitted, as described above, by telephone, or by VOIP technology, or through a microphone directly connected to the reviewer's computer. All such alternatives are within the scope of the invention.

For the embodiment comprising the creation of a video, the host computer comprises the means for displaying the video, and for accepting comments from reviewers. The host computer also comprises means for posting such comments so as to make them available to all reviewers. The host computer also includes means for indicating which portions of the video has associated comments, including the provision of coded portions of a video navigation bar (such as shaded areas 28 and 29), and the alteration of an attribute of the video itself (such as the tinting of portion of the video having associated comments). The host computer also comprises means for notifying reviewers of comments made by other reviewers, as described above.

The invention can be further modified in ways which will be apparent to the reader skilled in the art. Such modifications should be considered within the spirit and scope of the following claims.

What is claimed is:

1. A computing device having a memory and a processor, the computing device comprising:
   a component configured to enable electronic access to a slide kit for a first device associated with a first reviewer;
   a component configured to request confirmation from the first reviewer that the first reviewer desires to be contacted on a second device associated with the first reviewer, wherein the second device is different than the first device;
   a component configured to receive and store a non-textual comment from the second device of the first reviewer, wherein the non-textual comment is associated with a selected slide included in the slide kit; and
   a component configured to notify a second reviewer of the non-textual comment made by the first reviewer with respect to the selected slide.

2. The computing device of claim 1 wherein the first device comprises a computer and the second device comprises a telephone.

3. The computing device of claim 1 wherein the component configured to notify the second reviewer of the non-textual comment is configured to notify the second reviewer via electronic mail.

4. The computing device of claim 1 wherein the non-textual comment comprises an audio comment from the first reviewer.

5. The computing device of claim 1 wherein the non-textual comment comprises a multimedia file from the first reviewer.

6. The computing device of claim 1 wherein the non-textual comment comprises an audio comment inserted into an existing audio track associated with the selected slide.

7. The computing device of claim 1, further comprising a component configured to place a telephone call to the second device, wherein the non-textual comment is received in response to the telephone call.

8. The computing device of claim 1, further comprising a component configured to send a link to the non-textual comment for access by the second reviewer.

9. The computing device of claim 1 further comprising a component configured to transmit the non-textual comment to the first reviewer for review via the first device or the second device.

10. The computing device of claim 1, further comprising a component configured to send a notification regarding the existence of the non-textual comment received from the first reviewer to a third reviewer who has previously commented on the selected slide, wherein the notification includes a link to the non-textual comment.

11. The computing device of claim 1, further comprising a component configured to enable one or more online editing features for editing the non-textual comment and a plurality of control buttons for navigating through the non-textual comment, wherein the plurality of control buttons include a fast forward button and a rewind button.

12. The computing device of claim 1, further comprising a component configured to enable electronic access to a transcriber for transcribing the non-textual comment to produce a textual version of the non-textual comment.

13. A computing device having a memory and a processor, the computing device comprising:
    a component configured to receive a non-textual comment from a first reviewer, wherein the non-textual comment is associated with a portion of a video, and wherein the video is accessed via the computing device;
    a component configured to enable access to the non-textual comment by a second reviewer; and
    a component configured to send a notification to the second reviewer regarding the existence of the non-textual comment received from the first reviewer without the second reviewer accessing the video to receive the notification.

14. The computing device of claim 13, further comprising a component configured to enable the display of one or more thumbnail images of the video, and wherein, upon selection of a particular thumbnail image, wherein the component con figured to enable the display of the one or more thumbnail images is further configured to play a scene of the video that includes the selected thumbnail image.

15. The computing device of claim 14, wherein the thumbnail images comprise a frame from each scene of the video with which comments have been associated.

16. A method in a computing device having a memory and a processor for reviewing and commenting on multimedia content, the method comprising:
    transmitting multimedia content to a first reviewer;
    receiving a non-textual comment from the first reviewer, wherein the non-textual comment is associated with at least a portion of the multimedia content; and
    sending an electronic notification to a second reviewer regarding the existence of the non-textual comment received from the first reviewer without the second reviewer accessing the multimedia content to receive the notification,
    wherein at least one of the transmitting, receiving, and sending are performed by the processor executing instructions stored in the memory.

17. The method of claim 16 wherein:
    transmitting multimedia content to the first reviewer comprises transmitting a speech to the first reviewer; and
    receiving the non-textual comment from the first reviewer comprises receiving audio comments from the first reviewer as part of an online debate.

18. The method of claim 16 wherein:
    transmitting multimedia content to the first reviewer comprises transmitting at least one X-ray image to the first reviewer; and
    receiving the non-textual comment from the first reviewer comprises receiving audio comments from the first reviewer as diagnostic commentary regarding the at least one X-ray image.

19. The method of claim 16 wherein:
    transmitting multimedia content to the first reviewer comprises transmitting a live conference call to the first reviewer; and
    receiving the non-textual comment from the first reviewer comprises receiving audio comments from the first reviewer related to the conference call.

20. The method of claim 16 wherein:
    transmitting multimedia content to the first reviewer comprises transmitting a lecture to the first reviewer; and
    receiving the non-textual comment from the first reviewer comprises receiving audio comments from the first reviewer regarding the lecture.

21. The method of claim 16, further comprising sending electronic notifications to a plurality of additional reviewers regarding the existence of the non-textual comment received from the first reviewer, without any of the plurality of additional reviewers accessing the multimedia content to receive notification.

* * * * *